May 1, 1962   R. M. TILLMAN   3,032,663
PULSE GENERATOR
Filed Oct. 21, 1957

INVENTOR.
ROBERT M. TILLMAN
BY Edward W. Hughes
ATTORNEY

3,032,663
PULSE GENERATOR
Robert M. Tillman, Willow Grove, Pa., assignor to Burroughs Corporation, Detroit, Mich., a corporation of Michigan
Filed Oct. 21, 1957, Ser. No. 691,199
4 Claims. (Cl. 307—88)

This invention relates to pulse generators and more particularly to a remanent switching magnetic pulse generator.

There have heretofore been developed monostable magnetic multivibrators in which the voltage time product of each output pulse produced by such generators is determined by the magnetic characteristics of the core with which each such pulse generator is provided. In such generators, it has generally been the practice, in the absence of an input pulse, to maintain the magnetic flux in the core at a maximum, or remanent, value of one polarity. In response to an input signal, the flux level in the core is changed from its maximum, or remanent, value of one polarity to its maximum value of the other, or opposite, polarity. On reaching this other maximum value, the core is then returned to its initial magnetic flux level. The core then remains in this state until such time as a second input signal or trigger pulse is applied to the device, whereupon the core is again caused to change from its initial flux value of said one polarity to its maximum flux level of its other polarity and back to its original value. The magnitude of magnetic flux of the core is maintained at its negative maximum value, for example, by having a unidirectional bias current flow through a bias winding on the core. The magnetomotive force due to the current in the bias winding is sufficient to maintain the core at its negative maximum value. Such action is generally referred to as being "D.C. reset."

The remanent switching magnetic pulse generator, in response to an input signal, produces output pulses whose voltage time products are constant. However, instead of switching the magnetic flux in the core from its negative maximum value to its positive maximum value, for example, the magnetic flux in the core is swept, or changed, from its remanent flux value of one polarity to its maximum flux value of the same polarity. The magnetomotive force which causes this change in flux in the core from remanent to maximum value then terminates. The magnetic flux in the core returns to its remanent value without the necessity of applying a magnetomotive force to the core. The core of the pulse generator then remains in its remanent condition until another trigger pulse is applied.

In a remanent switching magnetic pulse generator there is no need for a magnetomotive force to return and/or maintain the core at its negative maximum value. As a result, the circuit and bias winding heretofore required to accomplish this function in prior art D.C. reset magnetic pulse generators may be eliminated. There is also no need for the magnetomotive force which causes the core to change from its remanent state to its maximum flux value to overcome the magnetomotive force which normally is used to maintain the flux in the core in its opposite maximum value.

It is, therefore, an object of this invention to provide an improved pulse generator.

It is a further object of this inevntion to provide a remanent switching magnetic pulse generator.

It is still a further object of this invention to provide a pulse generator which is capable of producing pulses whose widths are accurately controlled.

It is another object of this invention to provide a pulse generator which can produce controlled pulse widths of the order of tenths of microseconds.

It is still another object of this invention to produce a pulse generator using solid state components and in which the number of components and the power consumed is minimized.

Other objects and many of the attendant advantages of this invention will be readily appreciated as the same become better understood by reference to the following detailed description when considered in connection with the accompanying drawings, wherein.

Figure 1:
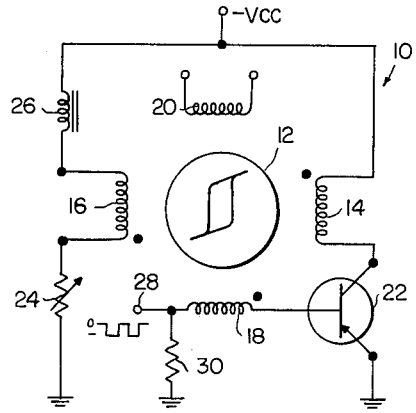
FIG. 1 is a schematic diagram of a prior art magnetic pulse generator.

FIG. 1 is a schematic diagram of a conventional magnetic pulse generator 10. Pulse generator 10 is provided with a core 12 which is preferably toroidal and formed of a magnetic material having substantially rectangular hysteresis characteristics. Wound on core 12 is a collector, or load, winding 14, a bias winding 16, a base, or control, winding 18, and an output winding 20. One terminal of each of the windings 14, 16 and 18 is dotted. This symbolization is used to indicate the direction in which windings 14, 16 and 18 are wound on core 12. By definition, conventional electrical current flowing into a dotted terminal will cause the resultant magnetic field H to be negative, and conventional electrical current flowing out of a dotted terminal will cause the magnetic field H to be positive. The collector of the junction transistor 22 which is illustrated as being a pnp transistor is connected to the undotted terminal of winding 14. The undotted terminal of winding 16 and the dotted terminal of winding 14 are connected to a suitable source of D.C. potential $-Vcc$, which is not illustrated. The dotted terminal of winding 16 is illustrated as being connected through variable resistor 24 to a point at ground, or reference potential. Inductor 26 is connected in series with bias winding 16 and variable resistor 24 to reduce variations in current flowing through bias winding 16. The dotted terminal of base winding 18 is connected to the base of transistor 18, and the undotted terminal is connected to input terminal 28.

Figure 3:
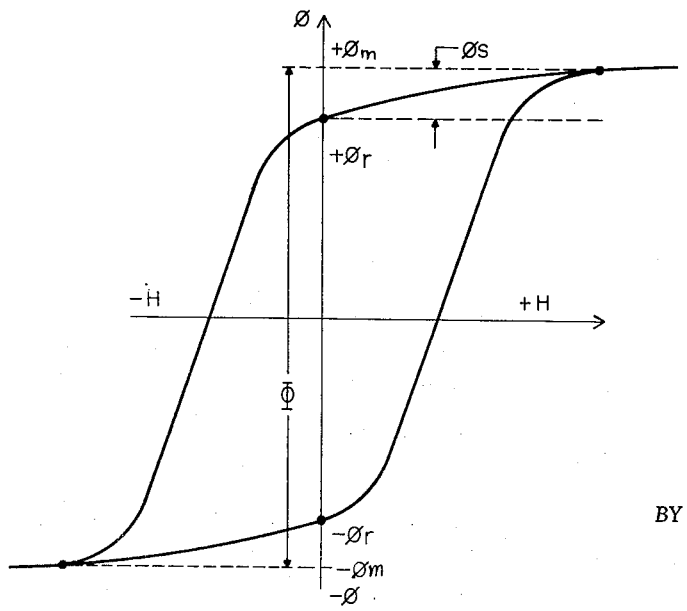
FIG. 3 is an idealized hysteresis loop of a magnetic material having substantially rectangular characteristic.

As long as no trigger pulse, or input signal, is applied to input terminal 28, the base of transistor 22 will be substantially at ground potential because of resistor 30 which is connected between input terminal 28 and ground. Therefore, transistor 22 will be cut off and substantially no collector current will flow through winding 14. The value of resistor 24 is adjusted so that the magnitude of the current flowing through bias winding 16 will maintain the magnetic field of core 12 at its maximum negative value $-\phi_m$, for example, as illustrated in FIG. 3.

The application of a negative input pulse of sufficient magnitude and duration to input terminal 28 and through base or control winding 18 to the base of transistor 22 will cause transistor 22 to begin to conduct. Collector current of transistor 22 flowing through winding 14 creates a positive magnetic field of sufficient strength to cause core 12 to change its magnetic state from $-\phi_m$ to $+\phi_m$. Windings 14 and 18 are regeneratively coupled so that as the magnitude of the flux in core 12 is switched from $-\phi_m$ to $+\phi_m$, the voltage induced in base winding 18 is sufficiently large and of the proper polarity, in this example, negative, to maintain transistor 22 conducting heavily until the flux in core 12 reaches the value of $+\phi_m$.

When the flux value reaches $+\phi_m$, the coupling between windings 14 and 18 is insufficient for the voltage induced in winding 18 to bias transistor 42 sufficiently hard to cause any further increase in H or $\phi$. The magnitude of the voltage induced in winding 18 quickly decreases which causes transistor 22 to quickly cut off. The current flowing through winding 16 then returns the magnetic flux in core 12 to $-\phi_m$ where it remains until the next input pulse is applied to the base of transistor 22. The magnetomotive force produced by collector current flowing through load winding 14 must be sufficient to overcome the magnetomotive force of winding 16 and cause the flux in core 12 to reach the value $+\phi_m$. The voltages induced in winding 18 when the flux in core 12 is returning to its $-\phi_m$ value, is of the polarity to maintain transistor 22 off.

Figure 2:
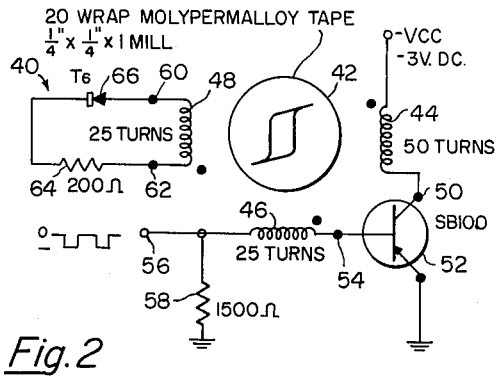
FIG. 2 is a schematic diagram of a remanent switching magnetic pulse generator.

In FIG. 2 there is illustrated a schematic diagram of a remanent switching monostable magnetic multivibrator 40 according to the present invention. Remanent switching magnetic multivibrator 40 is comprised of a core 42 which is preferably toroidal and formed of a magnetic material such as "4–79 Moly Permalloy" having a substantially rectangular hysteresis characteristic similar to that illustrated in FIG. 3 wherein there exists a small but significant difference between positive remanence $(+\phi_r)$ and positive saturation $(+\phi_m)$. Wound on core 42 is a collector, or load, winding 44; a control or base winding 46; and an output winding 48. One terminal of each of windings 44, 46 is indicated as being dotted. The symbolization of the dotted terminals of windings 44, 46 is the same as the windings of the device illustrated in FIG. 1. The collector 50 of junction transistor 52 is connected to the undotted terminal of load winding 44. The dotted terminal of winding 44 is connected to a suitable source of collector potential $-Vcc$, which is not illustrated. The dotted terminal of the control winding 46 is connected to the base 54 of transistor 52, and its undotted terminal is connected to input terminal 56 of the pulse generator 40. Input terminal 56 is connected to a point at reference potential, or ground, through base resistor 58. Transistor 52 is illustrated being a pnp transistor preferably of the junction type.

In the absence of a negative input pulse, the base 54 of transistor 52 will be substantially at ground potential since it is connected to ground through control winding 46 and base resistor 58, so that transistor 52 is cut off. Thus there is substantially no magnetomotive force applied to core 42, or the magnetic field strength H in core 42 is substantially zero. Also, since transistor 52 is cut off, substantially no electrical power is being consumed by pulse generator 40.

When an input signal or pulse of sufficient amplitude and duration is applied to terminal 56, it causes the base 54 of transistor 52 to become sufficiently negative to cause transistor 52 to begin to conduct. Current flowing through load winding 44 creates a positive magnetic field H. This causes the magnetic flux $\phi$ in core 42 to increase positively from whatever value it initially possessed. As the flux $\phi$ increases in core 42, a voltage is induced in control winding 46 of the polarity and magnitude to maintain transistor 52 conducting heavily, or windings 44, 46 are regeneratively coupled. When the flux within core 42 reaches the maximum value $+\phi_m$, the coupling between windings 44, 46, becomes insufficient to bias transistor 52 to cause a further positive increase in H. Regeneration then ceases and transistor 52 begins to cut off which tends to decrease the current flow through load winding 44 which, in turn, decreases the magnitude of the magnetic field H, and the magnitude of the flux $\phi$ in core 42. As the magnitude of the magnetic flux decreases from $+\phi_m$, the change in $\phi$ induces a voltage in winding 46 of a polarity to aid in shutting off transistor 52. The magnitude of the flux in core 42 then quickly returns, or slips back from the value $+\phi_m$ to $+\phi_r$. The magnitude of the flux in core 42 will remain at its positive remanent value $+\phi_r$ until the next input signal starts transistor 52 to conducting.

Figure 4:
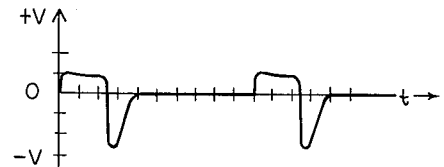
FIG. 4 is a graph of output voltage plotted against time.
Figure 5:
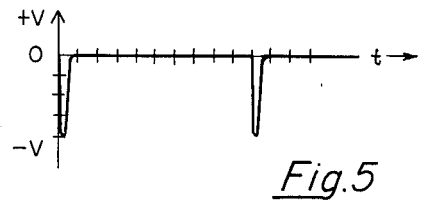
FIG. 5 is a graph of input trigger pulses plotted against time.

In FIG. 4 there is illustrated the voltage waveform across the terminals 60, 62, of output winding 48 of remanent switching magnetic pulse generator 40 when a load consisting of a resistor 64 and diode 66 is connected in series between terminals 60, 62. In FIG. 5 there is illustrated the trigger, or input pulses which were applied to the input terminal 56 to produce the waveforms of FIG. 4. The scale of the two figures is .2 of a microsecond per unit and one volt per unit. The trigger repetition rate is 500 kc. The amplitude of the trigger pulse is 4 volts and its width is substantially .1 microsecond. When diode 66 is connected in series with the load as illustrated in FIG. 2 and when the diode is poled to permit conduction while the flux in core 42 changes from its remanent value to its maximum value, the amplitude of the output voltage is substantially constant, i.e., a square wave. The amplitude and width of negative spike produced on slipback from the maximum value of $\phi$ to the remanent value of $\phi$ is a function of the time constant of the output circuit. Diode 66 prevents loading of the slipback pulses by minimizing the time constant of the output circuit.

Figure 6:
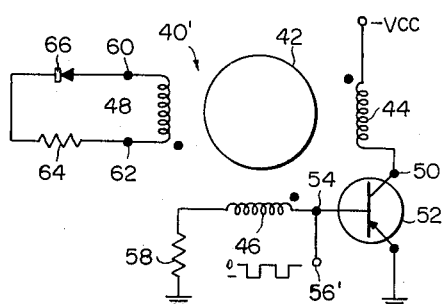
FIG. 6 is a schematic diagram of a modification of the remanent switching magnetic pulse generator illustrated in FIG. 2.

FIG. 6 is a modification of circuit illustrated in FIG. 2 in which the input terminal 56' is directly connected to the base 54 of transistor 52. The advantage of applying the trigger signals directly to base 54 is that the input signal is not attenuated by the impedance of base winding 46. Also, the regenerative voltages across control winding 46 do not oppose the trigger pulse. Loading of the source of the trigger pulses can be further reduced by capacitively coupling the source of the trigger pulses to terminal 56. Otherwise, the circuit of FIG. 6 operates substantially the same as that illustrated in FIG. 2.

The relationship between the potential $v$, in volts, across a winding on a core and the rate of change of flux $\phi$ in maxwells in the core is given by the following equation:

$$v = 10^{-8} N \frac{d\phi}{dt} \quad \text{(Equation 1)}$$

Substituting $Vcc$ for $v$ in Equation 1, and integrating Equation 1 provides:

$$Vcc \int_0^T dt = 10^{-8} N \int_{-\phi_m}^{+\phi_m} d\phi \quad \text{(Equation 2)}$$

$$VccT = 10^{-8} N \phi_s \quad \text{(Equation 3)}$$

$$T = \frac{10^{-8} N \phi_s}{Vcc} \quad \text{(Equation 4)}$$

where:
$\phi_s = +\phi_m - (+\phi_r)$
$t$ = time in seconds
$N$ = number of turns
$T$ = time for the flux in the core to change from $\phi_r$ to $\phi_m$.

When transistor 52 is conducting heavily, or it is saturated, the voltage drop across transistor 52 is very small so that the voltage drop across load winding 44 is substantially equal to $Vcc$. Thus the substitution of $Vcc$ for $v$ in Equation 2 is justified. Assuming that the time for transistor 52 to turn on in response to an input signal and to turn off when the flux value in core 42 reaches $+\phi_m$ is negligible, it is obvious that if $Vcc$ is substantially constant, the rate of change of $\phi$ with time, $d\phi/dt$, will be substantially constant and the amplitude of the voltage induced in output winding 48 will be substantially a square wave when the flux in core 42 is being driven from $+\phi_r$ to $+\phi_m$ as is seen in FIG. 5. The magnitude of the change in flux, $\phi_s$, is substantially constant since the value $\phi_r$ is a constant determined by the material from which core 42 is made and $+\phi_m$ is also substantially a constant whose magnitude is determined by the characteristic of the core and of the circuit means associated with the core. From Equation 4 it is obvious that the pulse width of each output pulse produced in output winding 48 is determined by N, the number of turns in output winding 48 which is a constant and the value of Vcc which can be made a constant.

When it is desired to produce narrow pulses of controlled width; i.e., pulse widths of .1 to 1.0 microsecond it is obvious from Equation 4 that the magnitude of the switched flux $\phi_s$ and the number of turns N be made small and the supply potential Vcc be made as large as possible. When such narrow pulses are produced by switching the flux from $-\phi_m$ to $+\phi_m$, for example, it is necessary to use very small non-standard cores. Such cores are so small that they must be hand wound rather than machine wound. Thus the cost of manufacturing the circuit using such small cores becomes very high. When a remanent switching pulse generator is used to produce pulses having such narrow pulse width standard sized cores may be used since only that portion of the flux between $+\phi_r$ and $+\phi_m$, for example, is switched. Such standard sized cores may be machine wound so that the cost of producing such a pulse generator is minimized. By increasing the number of turns in the output winding, decreasing Vcc and increasing the magnitude of $\phi_s$, the pulse width of each output pulse can be increased to the order of 100 microseconds or more.

Since no D.C. bias winding current limiting resistor or inductor are required in a remanent switching pulse generator, the number of components is significantly reduced. Also since no current is constantly flowing through the D.C. bias winding, substantially no power is consumed except when an output pulse is produced, thus minimizing the amount of power consumed. In a remanent switching magnetic pulse generator, the magnetomotive force produced by collector current flowing in load winding 44 does not have to overcome the bias magnetomotive force of the device illustrated in FIG. 1. Thus, to produce a given magnetic force H, a transistor having a lower power rating may be used in a remanent switching pulse generator. In a remanent switching pulse generator there is substantially no hysteresis loss in the magnetic core. The phenomena of switching a magnetic material from remanent to maximum flux values of the same polarity is essentially a rotational process, as contrasted with a domain wall motion process. Rotational processes are much faster than domain wall processes. Therefore, the time required for the magnetic flux to return to its remanent value upon termination of the magnetizing force H is very short, on the order of millimicroseconds.

Changes in the magnitude of the $\phi_s$ where:

$$\phi_s = \phi_m - \phi_r \qquad \text{(Equation 5)}$$

with changes in the temperature of the core is apparently an inherent characteristic of magnetic materials, however, experiments indicate that the rate of change $\phi_s$ with temperature is approximately half that of the rate of change of total switched flux $\Phi$ with temperature where:

$$\Phi = +\phi_m - (-\phi_m) = 2\phi_m \qquad \text{(Equation 6)}$$

The pulse width of each output pulse produced is substantially independent of a transistor gain $\beta$. The magnetic flux reaches its maximum value $\phi_m$ where regenerative coupling between windings 44 and 46 becomes insufficient to cause any further increase in H. At this flux value, substantially all the magnetic domains of the core are aligned and the slope of the hysteresis loop is small. Therefore, variations in $\beta$ which produce minor changes in H will produce negligible changes in $\phi_m$ because the slope of the hysteresis loop is substantially horizontal at this flux value.

In the embodiments of the invention illustrated in FIG. 2 and FIG. 6, the transistors have been illustrated and described as being pnp transistors. As is well known in the art, npn transistors may be substituted for pnp transistors provided the polarity of the supply voltage and the polarity of the triggering pulses are reversed. Likewise the direction of the windings on the core may be reversed without changing the operation of the remanent switching magnetic pulse generator.

The values and/or types of components and voltage appearing in FIG. 2 are included by way of example only as being suitable for the device illustrated. It is to be understood that circuit specifications in accordance with the invention may vary with the design for any particular application.

Obviously many modifications and variations of the present invention are possible in the light of the above teachings. It is, therefore, to be understood that within the scope of the appended claims the invention may be practiced other than as specifically described and illustrated.

What is claimed is:

1. A remanent switching pulse generator comprising in combination, a magnetic element of a material having relatively high retentivity and capable of assuming either of two stable states of magnetic remanence of opposite polarities, said material being operated between magnetic remanence and saturation of the same polarity in response to successively applied control signals, first and second windings regeneratively coupled on said magnetic element, switching means, having periods of quiescence and actuation, electrically interconnected between said first and second windings, said first winding being adapted to receive applied control signals for actuating said switching means, said second winding being adapted to receive energy from a potential source upon actuation of said switching means for driving said magnetic elements to saturation in the direction of said same polarity, and an output means magnetically coupled to said magnetic element, whereby during the quiescence and actuation periods of said switching means the magnetic element is operated between remanence and saturation of the same one polarity to produce an output pulse signal in response to the resulting change in flux.

2. A remanent switching pulse generator comprising in combination, a magnetic element of a material having relatively high retentivity and capable of assuming either of two stable states of magnetic remanence of opposite polarities, said material being adapted for operation between magnetic remanence and saturation of the same polarity, first and second windings regeneratively coupled on said magnetic element, a transistor having three electrodes, one of said electrodes being common to the other two, the remaining electrodes being connected to the first and second windings respectively, the electrode associated with the first winding being adapted to receive applied control signals for actuating said transistor, said second winding being adapted to receive energy from a potential source upon actuation of said transistor for driving said magnetic element to saturation in the direction of said same polarity, and an output means magnetically coupled to said magnetic element, whereby during the quiescence and actuation periods of said transistor, the magnetic element is operated between remanence and saturation of the same one polarity to produce an output pulse signal in response to the resulting change in flux.

3. A remanent switching pulse generator comprising in combination, a magnetic element of a material having relatively high retentivity and capable of assuming either of two stable states of magnetic remanence of opposite polarities, said material being characterized by having at least a significant difference between magnetic remanence and saturation of the same polarity, first and second windings regeneratively coupled on said magnetic element, switching means, having periods of quiescence and actuation, electrically interconnected between said first and second windings, said first winding being adapted to receive applied control signals for actuating said switching means, said second winding being adapted to receve energy from a potential source upon actuation of said switching means for driving said magnetic element to saturation in the direction of said same polarity, and a third output winding magnetically coupled to said magnetic element whereby during the successive quiescence and actuation periods of said switching means the magnetic element is operated between remanence and saturation of the same one polarity to produce an output pulse signal in response to the resulting change in flux.

4. A remanent switching pulse generator in combination, a magnetic element of a material having a substantially rectangular hysteresis loop, said hysteresis loop having a significant difference in flux between magnetic remanence and saturation of the same magnetic polarity and being operated between said remanent and saturation points of said same magnetic polarity, circuit means magnetically coupled on said magnetic element, amplifying means adapted for periods of quiescence and actuation electrically interconnected with said circuit means, said circuit means being adapted to receive applied control signals for driving said amplifying means to actuation and for receiving energy from a potential source during the actuation period, and an output means magnetically coupled to said magnetic element, whereby during the quiescence and actuation periods of said amplifying means the magnetic element is successively operated between remanence and saturation of the same one polarity to produce an output pulse signal in response to the resulting change in flux.

References Cited in the file of this patent

UNITED STATES PATENTS

| | | |
|---|---|---|
| 2,747,110 | Jones | May 22, 1956 |
| 2,876,438 | Jones | Mar. 3, 1959 |
| 2,891,170 | Paull | June 16, 1959 |
| 2,897,380 | Neitzert | July 28, 1959 |
| 2,898,580 | Kelly | Aug. 4, 1959 |

OTHER REFERENCES

"A Predetermined Scalar Utilizing Transistors and Magnetic Cores," by R. I. Vannice and R. C. Lyman, Proceedings of the National Electronics Conference, October 3–5, 1955, vol. XI, pp. 861 and 862.